United States Patent [19]

Ast

[11] Patent Number: 4,700,357
[45] Date of Patent: Oct. 13, 1987

[54] SYNCHRONIZING STAGE FOR THE ACQUISITION OF A SYNCHRONIZING SIGNAL HAVING LOW JITTER FROM A BITERNARY DATA SEQUENCE

[75] Inventor: Reinhold Ast, Germering, Fed. Rep. of Germany

[73] Assignee: Siemens Aktiengesellschaft, Berlin & Munich, Fed. Rep. of Germany

[21] Appl. No.: 795,318

[22] Filed: Nov. 6, 1985

[30] Foreign Application Priority Data

Nov. 22, 1984 [DE] Fed. Rep. of Germany ....... 3442613

[51] Int. Cl.$^4$ .......................................... H04L 25/60
[52] U.S. Cl. ......................................... 375/4; 375/76; 375/113
[58] Field of Search ................ 375/4, 17, 20, 110, 375/118, 119, 76, 113; 328/55, 56, 114; 307/269; 370/108

[56] References Cited

U.S. PATENT DOCUMENTS 4,339,823 9/1982 Predina et al. .................. 375/20
4,563,593 1/1986 Isobe et al. ...................... 328/114

FOREIGN PATENT DOCUMENTS 55-118248 9/1980 Japan ................................ 375/20

Primary Examiner—Robert L. Griffin
Assistant Examiner—Stephen Chin
Attorney, Agent, or Firm—Hill, Van Santen, Steadman & Simpson

[57] ABSTRACT

A synchronizing stage is provided in a regenerative repeater at the receiving side of a transmission circuit for acquiring a synchronizing signal from a biternary data sequence for synchronizing a clock generator in the regenerative repeater. First, second and third threshold switches respectively assigned first, second and third threshold values are provided, whereby a response of all three threshold switches occurs only given long signal edges of the biternary data sequence per signal edge. In addition, first, second and third delay units are assigned to the threshold switches and a logic circuit is provided, outputting the synchronizing signal given a response of all three threshold switches per signal edge, whereby the time for the starting edge of the synchronizing signal is referred to as the time at which a response of the second threshold switch occurs, the second threshold switch having a threshold value corresponding to the zero line of the biternary data sequence.

6 Claims, 2 Drawing Figures

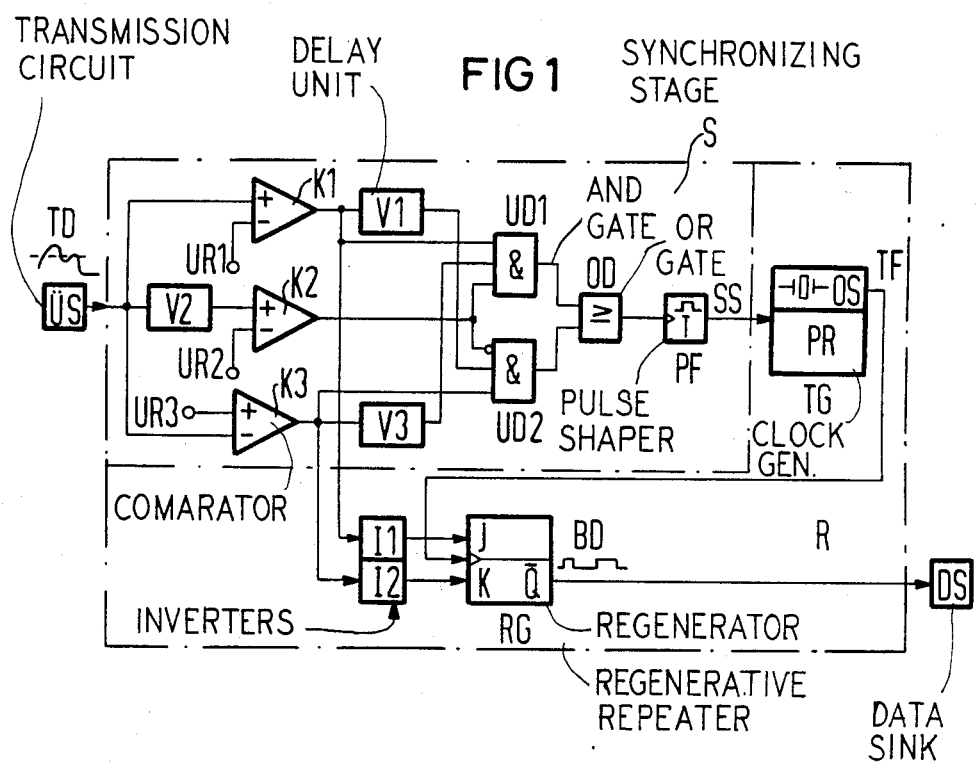

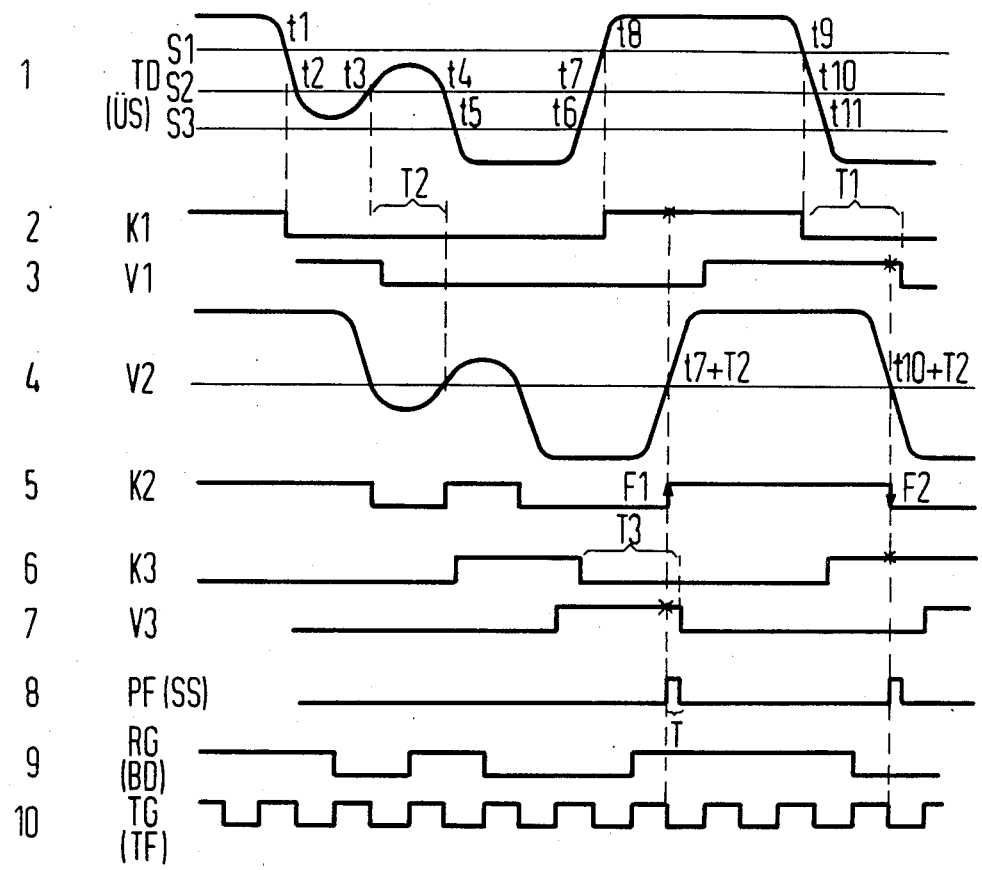

SYNCHRONIZING STAGE FOR THE ACQUISITION OF A SYNCHRONIZING SIGNAL HAVING LOW JITTER FROM A BITERNARY DATA SEQUENCE

BACKGROUND OF THE INVENTION

1. Field of the Invention

The present invention relates to a synchronizing stage in a regenerative repeater at the receiving side of a transmission circuit for the acquisition of a synchronizing signal from a biternary data sequence for the synchronization of a clock generator in the regenerative repeater.

2. Description of the Prior Art

In digital transmission technology, lines, light waveguides and radio links are employed as transmission circuits for analog signals and data signals. A plurality of transmission circuits must be connected following one another for connnecting points which lie far apart, whereby the individual transmission circuits are connected by elements referred to as regenerative repeaters. The regenerative repeaters serve the purpose of regenerating the signal received on the incoming transmission circuit, in terms of shape, and amplifying the received signal to a predetermined signal intensity and outputting it to the outgoing transmission circuit.

Regenerative repeaters in radio link technology are known from the descriptive material for the radio link device FM7200 of the Siemens company.

It is generally standard to place the digital signals onto the transmission circuit with a limited bandwidth. Due to the band limitation, a binary or a biternary (binary coded ternary) data sequence arises at the receiving end of the transmission circuit dependent on the bit rate of a binary data sequence. Hereinbelow, that case in which the regenerative repeater receives a biternary data sequence via the transmission circuit shall be considered.

The binary data sequence alternately assumes four different amplitude values with reference to a zero line. These are a maximum positive and a maximum negative amplitude value, and a positive and a negative amplitude value. The two latter values are noticeably lower in amplitude than the maximum positive or, respectively, maximum negative amplitude value. Biternary data sequence comprises long and short signal edges, whereby along signal edge connects a maximum and a minimum amplitude value to one another and a short signal edge connects a maximum positive or, respectively, maximum negative amplitude value to a negative or, respectively, positive amplitude value. The steepness of these signal edges is dependent on the bit rate of the biternary data sequence.

The signal edges of the biternary data sequence are jittered due to the attenuation on the transmission circuit, i.e. they do not form a narrow line, but a spread line when, for example, displayed on an oscilloscope. In order to be able to regenerate the original binary data sequence in the regenerative repeater from the received, biternary data sequence, the bit clock must be recovered from the incoming biternary data sequence.

It is conceivable to sample the biternary data sequence on its zero line and thereby acquire synchronizing pulses for regenerating the bit clock. This method supplies a nearly accurate result given long signal edges of the biternary data sequence but does not supply this result in the case of the short signal edges. These, in particular, are greatly jittered infested. It is also conceivable to sample the biternary data sequence with threshold amplifiers whose thresholds lie approximately in the middle between the maximum positive amplitude value or, respectively, the maximum negative amplitude value and the zero line. In both cases, the results are inaccurate since, as already stated, the signal edges are dependent on the form of the binary data sequence, i.e. on the data stream.

SUMMARY OF THE INVENTION

The object of the present invention is to provide a synchronizing stage with which a synchronizing signal, which is independent of the jitter and the data stream of the biternary data sequence, is acquired from a binary data sequence.

The above object is achieved in a device of the type set forth above which is particularly characterized by a first, second and a third threshold switch, formed as comparators, and respectively assigned to a first, second and a third threshold value whereby a response of all three threshold switches occurs only at long signal edges of the biternary data sequence. The arrangement is further characterized by a first, second and a third delay stage respectively assigned to the threshold switches and by a logic component which emits the synchronizing signal given a response of all three threshold switches per signal edge, whereby the point-in-time for the starting edges of the synchronizing signal is referred to that point-in-time at which a response of the second threshold switch occurs whose appertaining threshold value corresponds to the zero line.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a logic block diagram of a regenerative repeater comprising a synchronizing stage constructed in accordance with the present invention; and FIG. 2. is a pulse diagram illustrating pulse trains on the specific lines of the synchronizing stage of FIG. 1.

DESCRIPTION OF THE PREFERRED EMBODIMENTS

Referring to FIG. 1, a regenerative repeater is generally illustrated at R for receiving a biternary data sequence TD from a transmission circuit ÜS and emitting a binary data sequence BD to a data sink DS. The transmission circuit ÜS can be, for example, a light waveguide. The data sink DS can be, for example, a teleprinter or a further transmission circuit. The regenerative repeater R contains a synchronizing stage S constructed in accordance with the present invention, a clock generator TG, a regenerator RG and two inverters I1, I2.

The synchronizing stage S comprises first, second and third comparators K1, K2, K3, first, second and third delay units V1, V2, V3, first and second AND gates UD1, UD2, an OR gate OD and a pulse shaper PF.

The biternary data sequence TD output from the transmission circuit ÜS is applied to the noninverting input of the first comparator K1, via the second delay unit V2 to the noninverting input of the second comparator K2, and to the inverting input of the third comparator K3. First, second and third reference voltages UR1, UR2, UR3 are applied to the respective other inputs of the comparators K1, K2 and K3. The outputs of the first and second comparators K1, K2 are directly connected to the inputs of the first AND gate UD1, and the output of the third comparator K3 is connected to the inputs of the first AND gate UD1 via the third delay unit V3. The outputs of the second and third comparators K2, K3 are directly connected to the inputs of the second AND gate UD2 and the output of first comparator K1 is connected to an input of the second AND gate via the first delay unit V1. The output of the second comparator K2 is connected to an inverting input of the second AND gate UD2. The outputs of the two AND gates UD1, UD2 are connected by way of the OR gate OD to the pulse shaper PF.

The pulse shaper PF, which outputs a synchronizing signal SS, is realized, for example, by a one-shot multivibrator which emits a short, positive pulse having a pulse duration T at a rising signal edge.

The synchronizing signal SS output by the pulse shaper PF is applied to the clock generator TG. The clock generator TG contains an oscillator OS and a phase-locked control loop PR. The oscillator OS of the clock generator TG emits a clock pulse train TF. The clock pulse train TF is synchronized by the synchronizing signal SS via the phase-locked control loop PR which, for example, is realized by a PLL control.

Further, the outputs of the first and third comparators K1 and K2 are connected by way of a respective converter I1, I2 to the regenerator RG. The regenerator RG is realized by a JK flip-flop, whereby the first comparator K1 is connected via the inverter I1 to the J input and the second comparator K2 is connected via the inverter I2 to the K input. The clock pulse train TF output by the clock generator TG is applied to a clock input of the regenerator RG which is identified with a corresponding symbol. The binary data sequence BD regenerated from the biternary data sequence TD is output by an inverting output $\bar{Q}$ of the regenerator RG.

FIG. 2 shows pulses on some lines of the regenerative repeater R. In detail, these are:
1. Line 1 is the biternary data sequence TD output from the transmission circuit ÜS;
2. Line 2 is the output signal of the first comparator K1;
3. Line 3 is the output signal of the first delay unit V1;
4. Line 4 is the output signal of the second delay unit V2;
5. Line 5 is the output signal of the second comparator K2;
6. Line 6 is the output signal of the third comparator K3;
7. Line 7 is the output signal of the third delay unit V3;
8. Line 8 is the output signal of the pulse shaper PF;
9. Line 9 is the binary data sequence BD output by the regenerator RG; and
10. Line 10 is the clock pulse train TF output by the clock generator TG.

The manner of operation of the synchronizing stage shown in FIG. 1 shall be explained in detail below with reference to FIG. 2.

Three threshold switches are realized by the comparators K1, K2 and K3, these responding given an upward or, respectively, downward transgression of the appertaining thresholds S1, S2 and S3 by the biternary data sequence TD, i.e. changing their binary output states. The thresholds S1, S2 and S3 are determined by the reference voltages UR1, UR2 and UR3. The second threshold S2 thereby corresponds to the zero line of the biternary data sequence TD, the first threshold S1 lies roughly in the center between the zero line and the maximum value, and the third threshold S3 lies between the zero line and the minimum value of the biternary data sequence TD. A respective response of tone of the three amplifiers, i.e. of the comparators K1, K2 and K3, occurs at the times t1, t2, . . . t11 (FIG. 2, line 1). The first and second comparators K1 and K2 are connected such that they output a signal level at their outputs which corresponds to a logical "1" as long as the amplitude value of the biternary data sequence does not fall below the first or, respectively, second threshold S1, S2. The third comparator K3 is connected such that it outputs a signal level which corresponds to the logical "1" as long as the the amplitude value of the biternary data sequence TD does not exceed the third threshold S3. The synchronizing stage S of the invention is based on the concept that the synchronizing signal SS is output due to the response to the second comparator K2 only given long signal edges, i.e. given signal edges between a minimum amplitude value and a maximum amplitude value of the biternary data sequence TD. A long signal edge is characterized in that the response to the second comparator K3 is preceded by a response of the first or third comparator K1 or K3 and is followed by a response of the third or, respectively, first comparator K3 or K1.

The rising signal edges of the synchronizing signal SS are defined by the times t2, t3, t4, t7, t10 (FIG. 2, line 1) at which a response occurs by the second comparator K2, whereby the change of the output signal of the second comparator K2 (FIG. 2, line 5) occurs respectively delayed by the second delay time T2. The second delay time T2 is selected such that, given a long ascending or, respectively, decending signal edge of the biternary data sequence TD, a response, for example, the second comparator K2 at the time t7 or, respectively, t10 is followed within the second delay time T2 by a response of the first or, respectively, third comparator K1, K3. The second delay time T2 may not be shorter than the time difference between the successive response of the first and third or, respectively, third and first comparators (t11-t9 or, respectively, t8-t6, FIG. 2, line 1).

The response of the second comparator K2 is fed via the two AND gates UD1 and UD2 to the pulse shaper PF via the OR gate OD only when a level corresponding to the logical "1" is applied to the two respectively other inputs of the AND gate, UD1 and UD2. This condition is met given a long signal edge, namely at the points t7+T2 for the first AND gate UD1 (FIG. 2, lines 3, 4, 7) and at the times t10+T2 for the second AND gate UD2 (FIG. 2, lines 3, 4, 6).

A level corresponding to the logical "1" is applied to the first AND gate UD1 via the third delay unit V3 at the time t7+T2. The third delay time T3 and the first delay time T1 are selected such that, given a long signal edge of the biternary data sequence TD, the response of the third or, respectively, first comparator K3, K1 can still be read at the time t7+T2 or, respectively, t10+T2, i.e. at the time of the following response of the second comparator K2, being readable by way of a level corresponding to the logical "1" at the output of the third or, respectively, first delay unit V3 or V1.

At the time t7+T2, the output of the first comparator K1 produces a signal level corresponding to a logical "1" to the first AND gate UD1, so that a rising signal edge F1 of the output signal of the second comparator K2 is fed by the first AND gate UD1 via the OR gate OD to the pulse shaper PF at the time t7+T2.

At the time t10+T2, a level coresponding to the logical "1" is applied via the first delay unit V1 to the second AND gate UD2. At the time t10+T2, the output of the third comparator K3 provides a level corresponding to the logical "1" to the second AND gate UD1, so that a descending signal edge F2 of the output signal of the second comparator K2 is fed inverted from the second AND gate UD2 to the pulse shaper PF as a rising signal edge via the OR gate OD at the time t10+T2.

Due to the rising signal edge F1, or, respectively, descending signal edge F2 of the output of the second comparator K2 at the time t7+T2 or, respectively, t10+T2, the synchronizing signal SS having the pulse duration T is output by the pulse shaper PF due to the rising signal edge output in both cases by the OR gate OD. The clock pulse train TF (FIG. 2, line 10) is synchronized with the rising edge of the synchronizing signal SS. The synchronizing signal SS is delayed, for example, in a shift register, for chronologically matching the clock pulse train TF to the biternary data sequence TD. This shift register is not shown since it is of subordinate significance for the present invention.

It was assumed above that in the regeneration of the binary data sequence BD (FIG. 2, line 9) from the biternary data sequence TD that the biternary data sequence TD is sampled in the regenerator RG via the comparators K1 and K3 and the inverter I1 and I2 with the rising signal edges of the clock pulse train TF.

The second delay unit V2 is a matter of an analog module. In comparison to digital modules, this has the advantage that the second delay time T2, in particular the response of the second comparator K2, can be more accurately observed. The first delay unit V1 and the third delay stage V3 can be realized as digital modules.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A synchronzing stage for recovering a synchronizing signal from a biternary data sequence for synchronizing a clock generator in a regenerative repeater, the biternary data sequence comprising long and short signal edges, a long signal edge connecting a maximum and a minimum amplitude value and a short signal edge connecting a maximum positive amplitude value to a negative amplitude value or a maximum negative amplitude value to a positive amplitude value, said synchronzing stage comprising:
   first, second and third threshold circuits having respective first, second and third thresholds respectively defining a maximum signal level, a zero signal level and a minimum signal level of the biternary data sequence, minimum signal level of the biternary data sequence, each of said threshold circuits connected to receive the biternary data signal which triggers all of said three threshold circuits at the long signal edges of the biternary data signal;
   first, second and third delay units respectively connected to said threshold circuits for delaying the signal processed thereby for a respective predetermined interval; and
   a logic circuit connected to receive the outputs of said threshold circuits and produce a synchronizing sequence having leading edges at the time that the biternary data signal crosses the second threshold and in response to triggering of all three threshold circuits, including a logic element which is operable, first of all, to provide a logical AND operation between the delayed first, delayed second and the non-delayed third threshold circuit signals and, secondly, a logical AND operation between the non-delayed first, the delayed second and the delayed third threshold circuit signals.

2. The synchronizing stage of claim 1, wherein:
   each of said threshold circuits comprises a comparator.

3. The synchronizing stage of claim 1, wherein:
   said second delay unit is an analog delay unit connected to receive and feed the biternary data sequence to said second threshold circuit; and
   said first and third delay units are digital delay units and are respectively connected between said first threshold circuit and said logic circuit and said third threshold circuit and said logic circuit.

4. A synchronizing stage for recovering a synchronizing signal from a biternary data sequence for synchronizing a clock generator in a regenerative repeater, the biternary data sequence comprising long and short signal edges, a long signal edge connecting a maximum and a minimum amplitude value and a short signal edge connecting a maximum positive amplitude value to a negative amplitude value or a maximum negative amplitude value to a positive amplitude value, said synchronizing stage comprising:
   first, second and third threshold circuits having respective first, second and third thresholds respectively defining a maximum signal level, a zero signal level and a minimum signal level of the biternary data sequence, each of said threshold circuits connected to receive the biternary data signal and triggering all of said three threshold circuits in response to the long signal edges of the biternary data signal;
   first, second and third delay units respectively connected to said threshold circuits or delaying the signal processed thereby for a respective predetermined interval;
   a logic circuit connected to receive the outputs of said threshold circuits and produce a synchronizing sequence having leading edges at the time that the biternary data signal crosses the second threshold and in response to triggering of all three threshold circuits;
   said respective predetermined delay times comprising first, second and third delay times T1, T2 and T3;
   said second delay unit comprising an analog delay unit connected to receive and feed the biternary data sequence to said second threshold circuit and having said second delay time T2 such that the triggering of said second threshold circuit is followed within said second delay time by the triggering of said first or third threshold circuit during a long signal edge of the biternary data sequence; and said first and third delay units being digital delay unit connected respectively between said first and third threshold circuits and said logic circuit and respectively having said first delay time T1 and said third delay time T3 such that, given a long signal edge of the biternary data sequence, the triggering of the respective of third threshold circuit follows the triggering of the second threshold circuit within the delay time T2.

5. The synchronizing stage of claim 4, wherein said logic circuit comprises:

first and second AND gates each including first, second and third inputs and an output, said first input of said first AND gate connected to the output of said first threshold circuit, said second input of said first AND gate connected to the output of said third delay unit, said third input of said first AND gate connected to the output of said second threshold circuit, said first input of said second AND gate being an inverting input and connected to the output of said second threshold circuit, said second input of said second AND gate connected to said first delay unit, and said third input of said second AND gate connected to the output of said third threshold circuit; and an OR gate including an output for delivering a synchronizing signal and first and second inputs respectively connected to said outputs of said first and second AND gates.

6. The synchronizing stage of claim 5, and further comprising:

a pulse shaper connected to said output of said OR gate and responsive to a rising signal edge to produce a shaped synchronizing signal having a predetermined pulse duration.

* * * * *